United States Patent [19]

Youssef

[11] Patent Number: 5,203,286
[45] Date of Patent: Apr. 20, 1993

[54] APPARATUS FOR HEATING AND DEGASSING WATER

[75] Inventor: Mustafa Youssef, Zurich, Switzerland

[73] Assignee: Asea Brown Boveri Ltd., Baden, Switzerland

[21] Appl. No.: 712,703

[22] Filed: Jun. 10, 1991

[30] Foreign Application Priority Data

Jun. 11, 1990 [CH] Switzerland .............. 1949/90-1

[51] Int. Cl.$^5$ .......................... F16T 1/00; F22B 37/26
[52] U.S. Cl. .................... 122/488; 122/492; 55/198
[58] Field of Search .............. 55/198; 122/488, 492

[56] References Cited

U.S. PATENT DOCUMENTS

| | | | |
|---|---|---|---|
| 1,552,071 | 9/1925 | McDermet | 55/198 |
| 1,951,015 | 3/1934 | Gibson et al. | 55/198 |
| 2,308,721 | 1/1943 | Sebald | 55/198 |
| 2,677,433 | 5/1954 | Kretzschmar | 55/198 |

FOREIGN PATENT DOCUMENTS 1001686 1/1957 Fed. Rep. of Germany .
1167397 11/1958 France .
249283 3/1926 United Kingdom .............. 55/198
802149 10/1958 United Kingdom .

*Primary Examiner*—A. Michael Chambers
*Attorney, Agent, or Firm*—Burns, Doane, Swecker & Mathis

[57] ABSTRACT

An apparatus for heating and degassing water by means of steam, consisting of two columns (1, 17) with a co-current arrangement and counter-current arrangement of water and steam, and having packing or internals arranged therein, having a water distributor (11, 16) arranged at the top of each of the columns, having a water feed line (8) and a steam feed line (9), having a flushing steam feed line (22) arranged below the counter-current column and a deaeration line (15), located between the two columns, for the gas/steam mixture which is to be extracted. The lines lead into housings which are joined above, between and below the preferably cylindrical columns to the latter. In the upper part of the apparatus, a mixing chamber (5) is provided into which the water to be degassed is introduced via spray nozzles (7).

5 Claims, 3 Drawing Sheets

APPARATUS FOR HEATING AND DEGASSING WATER

BACKGROUND OF THE INVENTION

1. Field of the Invention

The invention relates to an apparatus for heating and degassing water by means of steam, essentially consisting of a column array accommodated in a housing and having a water feed line, leading above the column array into the housing, for the water which is to be heated and degassed, and having one steam feed line, leading into the housing, for the heating steam and one deaeration line for the gas/steam mixture which is to be extracted.

Such types of apparatus can be used in power station construction for degassing the condensate. In modern power station installations, particularly in combined types, the consumption of treated water is very high (15% and even more). The water consumed is replaced by cold make-up water which as a rule has a high air content. This leads to heavy heating and degassing duties.

Another important case is represented by the installations which produce process steam. The condensate flowing back from heat exchangers, reactors, heaters, etc., contains in most cases large quantities of dissolved air. In many cases, air-saturated make-up water (rain water) is also mixed in.

2. Discussion of Background

In connection with the degassing of liquids, exchange towers or columns are known, in which the steam and the liquid of a mixture are passed through in counter-current, in cross/counter-current or in co-current relative to one another (LUEGER, volume 16, Lexikon der Verfahrenstechnik [Dictionary of process engineering], 4th edition, Deutsche Verlags-Anstalt Stuttgart, page 51). In these columns, the liquid and the vapor of a mixture to be separated are passed through in counter-current or in co-current relative to one another in such a way that the two phases come into the most intimate contact possible for mass transfer and heat exchange.

The use of a degassing column in counter-current arrangement is correct in principle for obtaining the greatest separation effect at a defined column height. Major condensate streams at significant subcooling, however, involve the problem, in the case of a counter-current arrangement, that a very large proportion of the steam must overcome the lower part of the column (flooding of the packing due to higher steam loading), without a significant effect on the mass-kinetic separation effect, which arises in the lower part of the column, since the heating and the saturation process of the condensate take place in the upper part. The consequence of such a design solution is, however, that the diameter of the column must be increased enormously, in order to prevent flooding of the packing, with considerable additional costs for the apparatus.

At a high heating duty and a low required degassing effect, degassers with co-current arrangement can be used. The advantage of this arrangement is that the required large steam flow is introduced directly at the top in the mixing chamber, where the condensate is heated up. In addition to the preheated condensate, the flushing steam flows through the co-current column. This arrangement thus allows extensive heating of the condensate without a risk of flooding. The disadvantage of the co-current arrangement is that a high degassing effect cannot be achieved.

SUMMARY OF THE INVENTION

Accordingly, one object of this invention is to design a novel high-performance degasser having both a high heating performance and a high degassing performance.

According to the invention, this is achieved when the steam feed line is also arranged above the column array in the housing and leads into a mixing chamber in which spray means for the water are provided, a first column charged in co-current is arranged below the mixing chamber, a second column is provided below the first column, as viewed in the direction of water flow, a flushing steam feed line leads into the housing below the second column, so that the second column is charged in counter-current, and the deaeration line leads between the two columns into the housing.

The novel degasser type has the following advantages:

Due to the use of a co-current column and the arrangement of the steam feed above this column, the novel degasser type allows more extensive heating of the water, without risking the flooding limit which may be reached in the conventional counter-current degassers with heating steam feed below the counter-current column. This ensures a stable hydraulic behavior at relatively large heating steam flows.

Due to the feeding of the heating steam above the co-current column, the major part of the heating steam already condenses by contact with water in the vapor space. This leads to a lower vapor loading in the co-current column. A lower vapor loading also results in the lower, counter-current column, since only the small flushing steam flow passes through this column.

The lower steam flow loadings in the two columns allows smaller column diameters, which lead to savings in material and packing volume. The reduction of the diameter in the region of the columns is particularly advantageous if the degasser is placed, with an open lower end, on top of the feed water tank.

Due to the use of a counter-current column, a flushing steam feed below this counter-current column and the take-off of the extraction stream above the counter-current column, a greater water-degassing effect can be achieved, likewise without a risk of reaching the flooding limit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein three illustrative embodiments of the invention are diagrammatically illustrated by reference to mixing preheaters/degassers for use in power stations. In the drawings.

DESCRIPTION OF THE PREFERRED EMBODIMENTS

Figure 1:
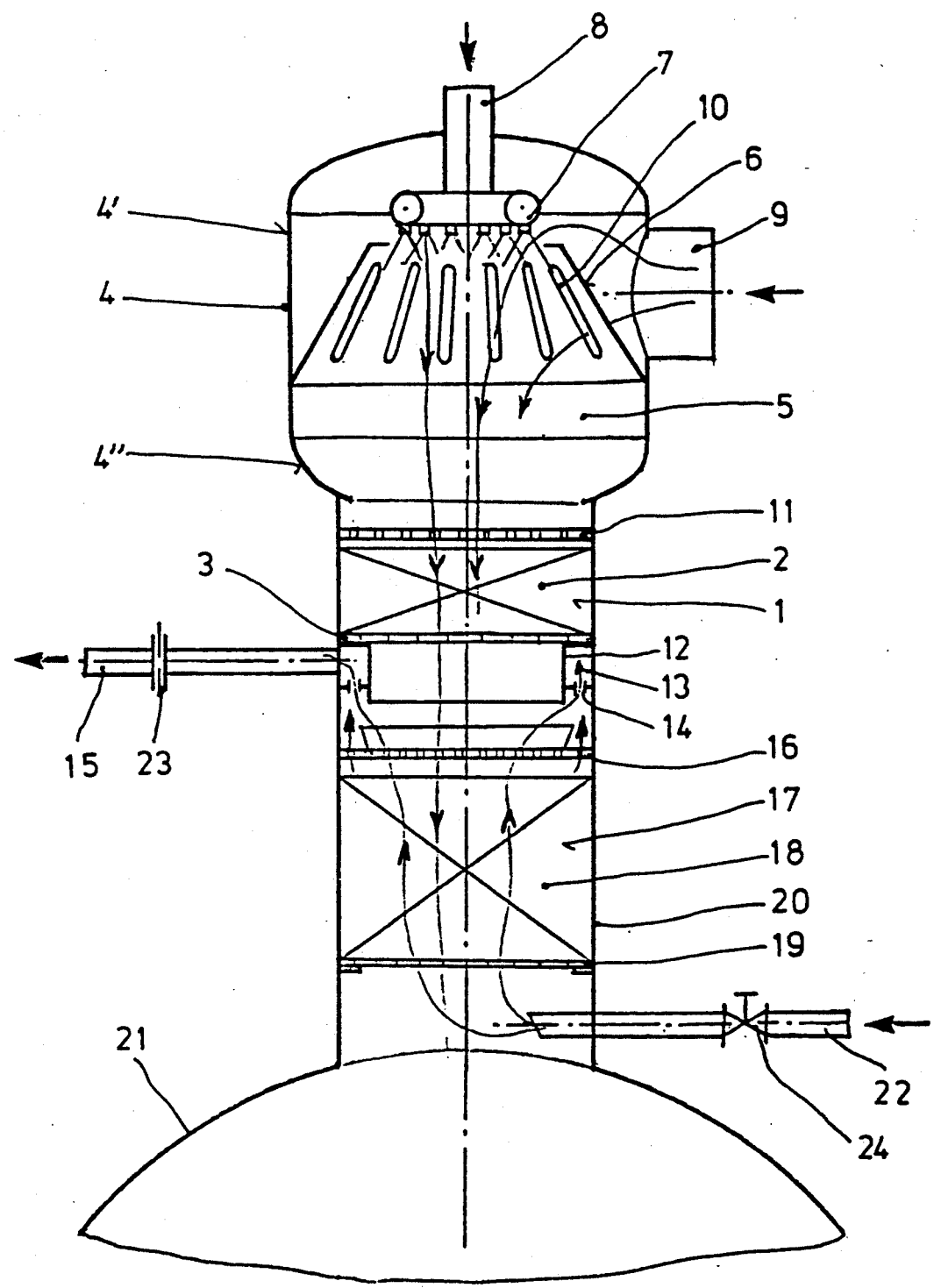
FIG. 1 shows a longitudinal section through a vertically arranged degasser.

Referring now to the drawings, only the essential elements required for an understanding of the invention are shown. Like reference numerals designate identical or corresponding parts throughout the several views. The direction of flow of the media concerned is indicated by arrows.

Even though the structure and function of mixing preheaters/degassers are adequately known, their problems may be briefly discussed: The degassing with simultaneous heating, such as typically takes place in power station installations, is distinguished by some special features. First of all, saturated low-pressure steam is available for the heating. Moreover, for the benefit of maximum utilization of the heat, a restriction of the steam and hence a reduction in the respective saturation temperature are undesired. The consequence of this is the vapor mass flow which is extracted from the subcooled condensate, determined only by the subcooling and the mass flow of condensate. In other words, a natural steady state is established in the degasser, and this depends only on the states and magnitude of the streams involved, without the intervention of a control loop for controlling the said effective parameters.

The stripping of the gases dissolved in the condensate initially takes place on a purely thermodynamic basis, since the lowering of the pressure due to the spraying and the increase in the temperature of the condensate due to the heating with steam cause a reduction in the saturation values of the dissolved gases (bubbling effect). As a result, the partial pressure of the dissolved gases exceeds the prevailing total pressure. The important part of the degassing, however, normally takes place on a purely mass-kinetic basis as a result of diffuse transport of the dissolved gases across the gas/liquid boundary layer. This transport process can take place only after thermal equilibrium has been reached.

Removal of the gases present in the gas phase is possible only if a part of the steam, which has been introduced and has been enriched with stripped gases, is discharged into a vessel at a lower pressure-normally a condenser.

With regard to these problems, the structure and mode of functioning of such types of apparatus for degassing are known to this extent.

According to the invention, the combination, which is largely insensitive to flooding of the packing, of a co-current arrangement with a downstream counter-current arrangement is now selected.

The novel apparatus according to FIG. 1 is essentially composed of the following parts:

A first cylindrical column 1 contains layered pieces of packing 2, called packing below. This can be a loose bed, i.e. so-called random packing. Regular packing, which has the advantages of a greater separation effect at lower pressure drop due to homogeneously controlled distribution, is more suitable. The materials used for such types of packing known per se can be stainless steel, ceramics or plastic fabrics, all of which are distinguished by good wettability in aqueous systems. This first packing is, at least at its lowest end, held in the column by a packing grate 3.

A first housing 4 having a greater diameter than the column is placed on top of the vertically upright first column 1. It ends at the top in a dome. The upper housing part 4' has a cylindrical shape, and the lower housing part 4" is tapered in order to match the diameter of column 1. Within the cylindrical housing part 4', a mixing chamber 5 is formed, whose conical boundary wall 6 with its larger diameter is flush with the cylindrical housing part 4'.

In the region of the smaller diameter of the conical boundary wall, i.e. immediately above the latter, a water injection system is provided. This consists of annularly arranged spray nozzles 7 which are fed from a water feed line 8 penetrating the dome of the housing. The spray angle of the nozzles corresponds preferably to the cone angle of the boundary wall 6. The subcooled water, in the present case condensate having a high $O_2$ concentration, is sprayed into the mixing chamber via these nozzles.

A steam feed line 9 leads into the upper housing part 4'. The steam distributes itself within the dome above the boundary wall 6. In this boundary wall, openings 10 in the form of longitudinally aligned slots are provided, distributed around the entire circumference and over the height. The steam serving for heating and degassing blows through these slots concentrically inwards into the mixing chamber and mixes with the subcooled, injected condensate. Owing to the resulting heating which, however, remains below the saturation for the pressure prevailing in the mixing chamber, a part of the gases dissolved in the condensate is stripped out (bubbling effect).

The condensate which runs down on the tapering walls of the housing part 4" is passed into a distributor 11 of the first packing. This distributor is provided exactly above the packing 2. As a rule, this is a channel system in which the heated water running down is collected and distributed over the cylindrical cross-section of column 1. It should be noted at this point that, in the case of a large number of spray nozzles or with very good water distribution, the distributor may be omitted.

The water and the steam flow downwards through a number of layers in the first column, parallel in co-current. In the packing, the residual subcooling of the water is eliminated. Only a small part of the packing height is necessary for this purpose. After thermal equilibrium, i.e. the saturation temperature, has been reached, the degassing process takes place in the column on a purely mass-kinetic basis.

Immediately below the co-current column, a guard wall 12 is located which extends around and along the housing wall and which forms an annular deaeration chamber 13 protected from the water raining down. On the underside of the annular deaeration chamber closed on all sides, a number of holes 14 for deaeration is provided. A deaeration line 15 leads from the annular chamber 13 to the outside of the housing.

Downstream of the annular deaeration chamber, the water flowing down is again uniformly distributed over the cross-section by means of a screen or distributor 16.

Below the distributor 16, the second part of the novel column array is located. In the present example, this is a second column 17 which likewise contains layered packing 18 and is held at its lower end by a packing grate 19. The column 17, likewise of cylindrical shape, has the same diameter as the first column. However, this is not at all obligatory. This second column 17 is designed for counter-current arrangement, i.e. the preheated and partially degassed water flows downwards in the column, and the flushing steam flows upwards in counter-current. The residual quantity of gas is eliminated from the water in this column.

The required height of the counter-current column depends on the inlet concentration and on the desired outlet concentration of the water. Since only a relatively small mass flow of flushing steam flows upwards through the counter-current column against the downward-flowing water, there is no risk of flooding.

The second column 17 sits on a second housing 20, the lowest end of which stands upright on the feed water tank 21 which is merely indicated. It is to be understood that, if the apparatus is in an isolated arrangement, it must be provided with a bottom, in which case water discharge lines for the degassed and heated condensate must be provided, preferably in this bottom, i.e. at the lowest point of the apparatus.

A flushing steam feed line 22 which, in the present case, can branch off the steam feed line 9, leads into this second housing 20. Of course, the required flushing steam can, however, also be taken from another steam line of the installation, for example from a line at higher pressure.

Briefly stated, the functioning of the apparatus is as follows: The subcooled water and the heating steam are introduced at the top into the mixing chamber of the apparatus, the water being injected by means of nozzles or a spray valve. The water and the steam flow through the first column in co-current flow for the purpose of heating and degassing the water. The water and the flushing steam introduced below a second column flow through this second column in counter-current flow for further degassing of the water. The extraction stream is taken off between the two columns.

Accordingly, this extraction flow is as a rule the air-enriched flushing steam mass flow which passes through the annular deaeration chamber 13 and the deaeration line 15 to the extraction fan or condenser which are not shown.

The required mass flow of the extraction mixture depends on the inlet concentration of the oxygen in the water and on the desired outlet concentration thereof. An extraction steam flow of 20-50 times the maximum possible air content in the water at the inlet can be chosen, the air content in the water being determined from the $O_2$ concentration and the water mass flow. For degassing air-saturated water, an extraction flow of the gas/steam mixture of up to about 0.003 of the water mass flow or, in the case of extensive heating, up to about 3% of the heating steam mass flow, is required. The mass flow of the extraction mixture is controlled by means of a deaeration orifice plate 23 in the deaeration line 15.

The flushing steam mass flow should be as close as possible to the mass flow of the extraction mixture, preferably at 0.6-1.2. A part of the extraction flow can also be taken from the upper heating steam. If the flushing steam flow in the flushing steam feed line 22 is slightly greater than the extraction flow in the deaeration line 15, the differential steam flow will condense at the end of the co-current column 1. For the smaller flushing steam flow, a pipe 22 is selected which is correspondingly thinner than the steam feed line 9 and which is fitted with a flushing steam valve 24 for restricting and/or controlling the steam flow. For a better degassing effect of the apparatus, an optimization or matching of the two flows (flushing steam flow and extraction flow) to the inlet and outlet concentrations of the water by means of the deaeration orifice plate 23 and the flushing steam valve 24 is expedient.

Figure 2:
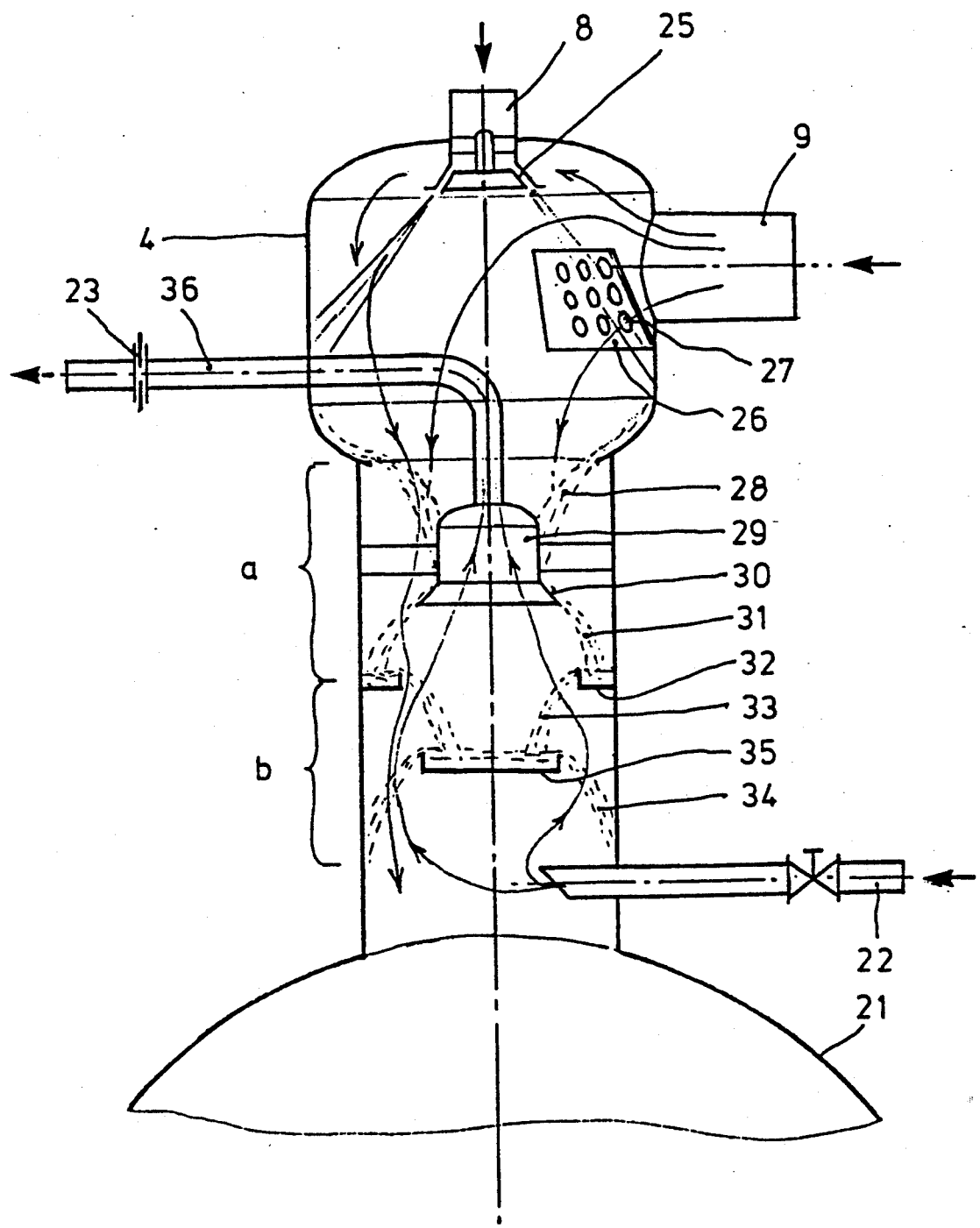
FIG. 2 shows a first embodiment variant of a degasser according to FIG. 1.

As distinct from FIG. 1, the spray means in the embodiment according to FIG. 2 comprise an actual spray valve 25 which sprays out the water to be heated within a conical distributor wall 26. The latter is a curved impingement plate with perforations 27 for the steam. The water is sprayed against the cylindrical upper housing part 4' and flows downwards on the taper walls of the lower housing part 4". The tapering free ends of this housing part 4" are slightly drawn in, i.e. they have a diameter slightly smaller than that of the column. As a result, a water curtain 28 is formed which is closed all round and which must be penetrated by the steam. This water curtain already forms a part of the first column (a) with co-current flow. The water curtain impinges on a central hood 29, runs downwards over the expanding collar 30 thereof to form a further curtain 31 which pours into a water channel 32 running around on the housing wall. The first column (a) extends as far as this point. The second column (b) through which the flushing steam passes in counter-current, starts with the overflow of the said channel 32 and is likewise composed of 2 water curtains 33 and 34, which are subdivided by means of a central receiver channel 35. Here again, the extraction flow is taken off between the two columns (a) and (b). For this purpose, the central hood 29 is of hollow construction, and the deaeration line 36 penetrates the upper housing 4 at a suitable point, in order to lead into the top of the central hood.

Figure 3:
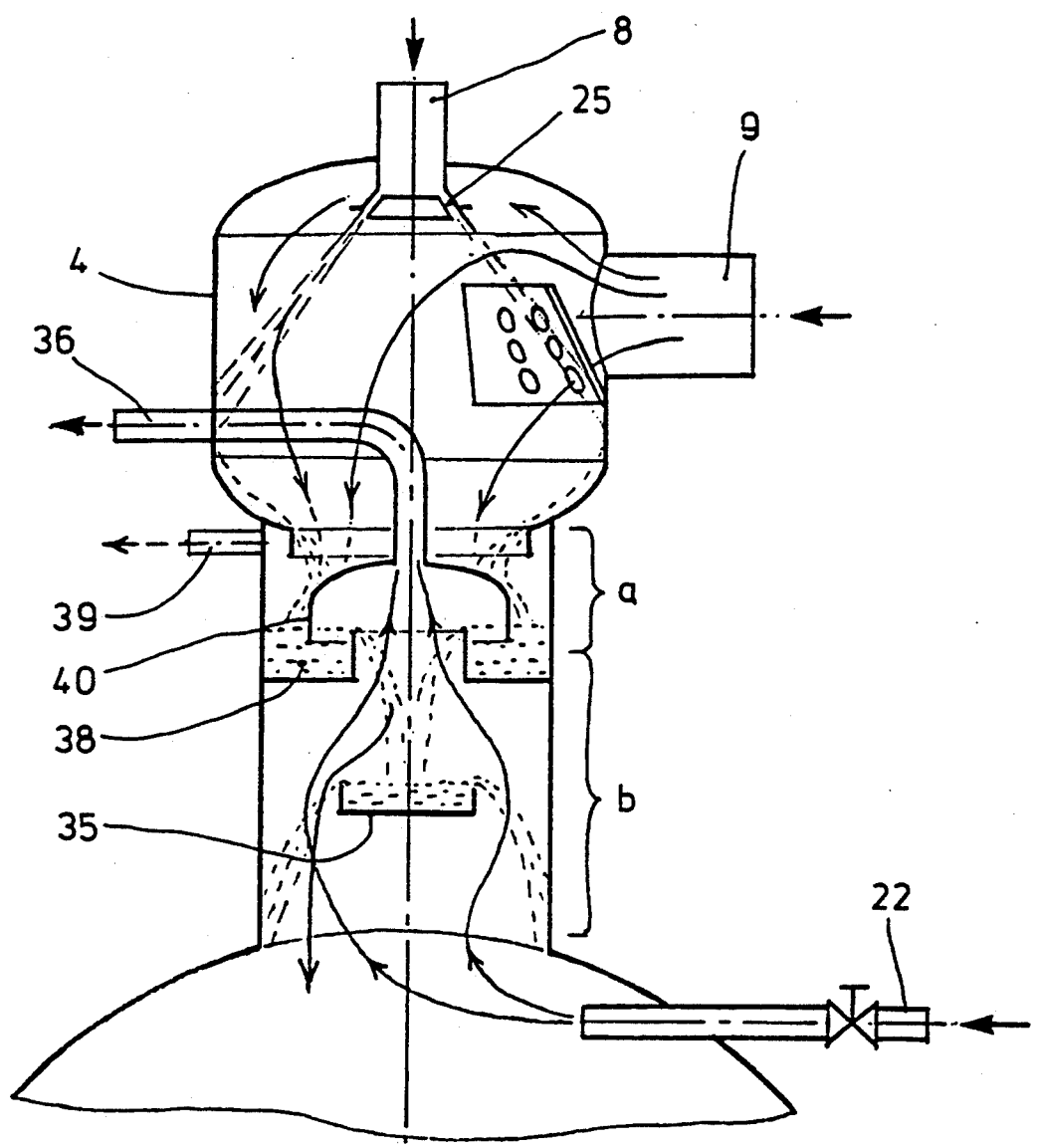
FIG. 3 shows a second embodiment variant of a degasser according to FIG. 1.

Finally, FIG. 3 shows a special case of the apparatus according to FIG. 2. At the end of the co-current column (a), a siphon 38 with two water levels is located. As a result, the two steam flows, i.e. the heating steam coming from above and the flushing steam coming from below, are completely separated from one another. In this solution, the gas/steam mixture arising after the first column is taken off via a separate deaeration line 39, whereas the flushing steam flowing in counter-current to the water flows off into the interior of the hood 40 which is designed here with a substantially greater diameter.

In power station installations, the degasser pressure is not controlled. The extracted steam mass flow is governed by the subcooling and the water mass flow. A natural steady state establishes itself in the degasser. The degasser pressure becomes virtually equal to the bleed steam pressure. In specific installations, a degasser pressure control and a steam control valve can be used, if it is intended for the degasser pressure to be below the heating steam pressure, or if steam flow control is permitted.

Of course, the invention is not restricted to the types of apparatus shown and described. As a special case of the types of apparatus according to FIGS. 1 and 2, i is possible, for example, in an apparatus to provide the first (co-current) column with internals according to FIG. 2 and to fit the second (counter-current) column with packing according to FIG. 1.

Furthermore, it is possible, for example, to introduce the hot and partially degassed condensate and the generally colder and air-saturated make-up water not via a common line into the apparatus, but to inject them at two different points into the mixing chamber. Preferably, this is effected in such a way that the condensate is introduced into the lower part of the mixing chamber, so that the upper part and the dome of the housing are left free for the heating of the make-up water introduced there.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. An apparatus for heating and degassing water by means of steam, essentially consisting of a column array accommodated in a housing and having a water feed line, leading above the column array into the housing, for the water which is to be heated and degassed, and having one steam feed line, leading into the housing, for the heating steam and one deaeration line for the gas/steam mixture which is to be extracted, wherein the steam feed line is also arranged above the column array in the housing and leads into a mixing chamber in which spray means for the water are provided, a first column charged in co-current is arranged below the mixing chamber, a second column is provided below the first column, as viewed in the direction of water flow, a flushing steam feed line leads into the housing below the second column, so that the second column is charged in counter-current, and the deaeration line leads between the two columns into the housing.

2. The apparatus as claimed in patent claim 1, wherein the column array is of cylindrical shape.

3. The apparatus as claimed in patent claim 1, wherein a water distributor is arranged on at least one column top.

4. The apparatus as claimed in patent claim 1, wherein a spray valve or spray nozzle are used as the spray means.

5. An apparatus for heating and degassing water by use of steam, comprising:

a housing, having an upper part and a lower part, the upper part defining a mixing chamber;

a water feed line entering the housing at the upper part and connecting with a spray means to spray water into the mixing chamber;

a steam feed line entering the housing at the upper part into the mixing chamber;

a first column located below the mixing chamber through which water from the mixing chamber flows downwardly;

a second column located below the first column through which water from the first column flows downwardly;

a deaeration line exiting the housing between the first and second columns; and a flush steam line entering the housing below the second column;

wherein steam from the steam feed line flows into the mixing chamber and mixes with the water spray, flows through the first column co-currently with the water flow and exits through the deaeration line, and flush steam from the flush steam line flows into the housing and through the second column counter-currently with the water flow and exits through the deaeration line.

* * * * *